Patented July 2, 1946

2,403,113

UNITED STATES PATENT OFFICE 2,403,113

UNSATURATED CARBONATE ESTER AND POLYMER THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application March 7, 1942, Serial No. 433,832

8 Claims. (Cl. 260—78)

This invention relates to a new class of unsaturated esters having valuable uses as resin intermediates. The new compounds are diesters of (a) a glycol containing at least three carbon atoms in a continuous chain and (b) a half ester of carbonic acid and an unsaturated alcohol.

The new compounds are esters of unsaturated alcohols. Preferably, they are esters of alcohols containing 3 to 5 carbon atoms and which have an unsaturated linkage in an aliphatic chain such as allyl, 2-methallyl, 2-chloroallyl, 2-ethylallyl, crotyl, isocrotyl, chlorocrotyl, tiglyl, angelyl, isopropenyl, alcohols, methyl vinyl carbinol, propargyl alcohol, butadienyl alcohol, divinyl carbinol, etc. Although esters of the short chain alcohols are preferred those of alcohols containing up to ten carbon atoms are also useful, for example, esters of linalool, cinnamyl alcohol, chlorocinnamyl alcohol, phenyl propargyl alcohol, diallyl carbinol, 1-hydroxy hexadiene-2,4, propyl allyl alcohol, n-octenol, etc.

The new compounds are unsaturated dicarbonates of glycols containing a continuous carbon chain of at least three carbon atoms. Suitable glycols are propylene glycol, trimethylene glycol, tetramethylene glycol, pentamethylene glycol, pinacone, dimethyl ethylene glycol, 1,3-dihydroxy butane, etc. The new compounds have the structure:

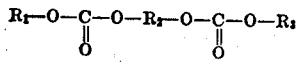

in which $R_1$ and $R_3$ are radicals derived from the unsaturated alcohols and $R_2$ is the radical derived from the glycol.

The new esters may be prepared by treating the above glycols with phosgene at temperatures between 0° C. and 20° C. by bubbling the gas through a reaction flask submerged in an ice bath or an ice-salt or other freezing mixture. The resulting dichloroformate of the glycol is then reacted with an unsaturated alcohol in the presence of pyridine or other tertiary cyclic amine or a carbonate, oxide, or hydroxide of an alkaline or alkaline earth metal. The latter reaction is performed by adding the chloroformate to a mixture of the alcohol and alkaline reagent. The reagents are combined slowly to permit the dissipation of the heat of reaction. The same new esters may alternatively be prepared by reacting the phosgene with the unsaturated alcohol to form the chloroformate and subsequently reacting the chloroformate with the glycol in the presence of an alkaline reagent.

Both the chloroformate preparation and the esterification are exothermic reactions and are both favored by low temperatures. Accordingly, an efficient cooling medium is usually required. Where, however, a slightly soluble alkaline reagent is used, the reaction is slower and higher temperatures, 50 to 100° C., may be required to promote an economical rate of reaction. Although the reactants may be combined in various proportions and by various methods, it is usually preferred to add the chloroformate to a mixture of alcohol and an excess of alkaline reagent. The reactions may be conducted in the presence of an inert solvent such as chloroform, carbon tetrachloride, acetone, ether, benzene, or petroleum ether.

The new unsaturated carbonates are generally non-resinous compounds having distinct boiling and melting points and are often capable of separation in substantially pure state. Frequently, however, the impurities are side reaction products which are colorless and transparent esters having characteristics similar to the esters herein contemplated. In some cases removal of the impurities may be unnecessary where they do not produce any detrimental effect in the use of the ester. The new compounds are usually liquids at room temperature but some, however, are solids. The new unsaturated compounds are usually miscible with solvents such as benzene, toluene, chloroform, diethyl ether, carbon tetrachloride and petroleum ether. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

These esters may be polymerized in the presence of heat, light, or catalysts such as oxygen, ozone, or organic peroxides such as lauroyl, benzoyl, and acetone peroxides, to yield solid or liquid compositions of widely differing physical properties. The polymerized products may vary in properties, depending upon the structure of the ester and upon the degree of polymerization.

The polyunsaturated esters contain at least two radicals derived from unsaturated alcohol and are capable of polymerization to a fusible intermediate stage and finally to a substantially infusible and/or insoluble form. The completely polymerized polyunsaturated compounds are, in general, substantially unaffected by acids, alkalies, water, and organic solvents. Intermediate polymers derived from the polyunsaturated esters having a wide range of properties may be secured by incomplete polymerization. The polymers thus obtained are transparent and colorless, although they may at times have slightly yellow cast, especially when polymerized completely. Many of these new polymers are generally tougher and more resistant to shattering than are the unsaturated alcohol esters of polybasic acids.

Upon the initial polymerization of the polyunsaturated esters in liquid monomeric state or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released, the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide, temperatures of 65 to 80° C. are suitable, while for acetone peroxide, temperatures of 140–150° C. may be used. In accordance with one modification, the gel after it is freed from the mold may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air which inhibits polymerization in the presence of a peroxide catalyst such as benzoyl peroxide. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often it is found desirable to release the polymer from the plate one or more times during polymerization of the coating in order to minimize formation of cracks or other surface defects.

Cast polymers may also be prepared by a single step polymerization directly to the insoluble infusible state. The monomer may be mixed with one to five percent of benzoyl or other organic peroxide and heated at 50–60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal (plasticized polyvinylchloride), butadiene polymers, polyvinyl alcohol, Thiokol (polyethylene sulfide), rubber, or similar materials arranged about the edge of such plates. The thickened monomer may be poured on one glass plate within the confines of the flexible retainer, laid about 2 inches from the edge of the plate. The second glass plate then may be carefully laid on top, taking care to avoid the trapping of air bubbles under the top plate. When the top plate is in position, both plates may be held together by means of suitable clamps which are capable of applying pressure upon the plates and are placed directly over the flexible retainers. The entire assembly is then placed in an oven and heated at 80 to 100° C. where the polymerization is continued. During the polymerization the resin shrinks and tends to draw away from the glass surfaces. To prevent fractures pressure is maintained upon the plates to depress the flexible retainer and permit the plates to remain in contact with the polymerizing resin. This pressure may be maintained by periodically tightening the clamps or by use of spring clamps which maintains a uniform pressure throughout the polymerization process.

By an alternative procedure for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent the edge of the plates and a suitable opening may be provided between the ends of the flexible retainer, preferably at one corner of the mold. The assembled mold is then placed in a vertical position with the open corner uppermost. The thickened monomer containing one to four percent residual peroxide is then poured in slowly until the entire mold is filled. After standing until all of the entrapped air has separated, the mold is heated uniformly between 70 and 100° C. to continue the polymerization. Pressure is maintained upon the plates to insure the contact of glass and resin during polymerization by suitable means such as by tightening the clamps periodically or by maintaining a uniform pressure upon the plates throughout by means of spring clamps. When the resin has been completely polymerized, it is separated from the glass plates and a hard, transparent, colorless, and durable resin sheet is obtained.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, by removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol, and alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer.

Preferably, the new polymers of polyunsaturated esters are produced by heating the monomer or a solution thereof in the presence of substantial quantities, for example, 2 to 5 percent of benzoyl peroxide until the viscosity of the solution has increased about 100 to 500 percent. This may require from one-half to two hours while heating at 65 to 85° C. in the presence of benzoyl peroxide. The resulting viscous solution is poured into an equal volume of water, methyl or ethyl alcohols, glycol or other nonsolvent for the fusible polymer. A polymer usually in the form of a powder or a gummy precipitate is thus formed which may be filtered and dried. This permits substantially complete separation of a soluble fusible polymer from unpolymerized monomer.

Often, however, such complete separation is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohols, polyallyl alcohols, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide, generally in a heated mold. The polymers may be mixed with fillers, such as alpha cellulose, wood pulp, and other fibrous substances, mineral fillers or pigments such as zinc oxide, calcium carbonate, lead chromate, magnesium carbonate and calcium silicate, and plasticizers, such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dibutyl phthalate, dioxane, carbon tetrachloride, phenyl cellosolve, dichlorethyl ether, or mixtures thereof, is useful as a liquid coating composition. Objects of paper, metal, cloth, wood, leather or synthetic resins may be coated with the solution of polymer in solvent and subsequently polymerized to yield attractively finished coatings. Similarly, porous objects of felt, cloth, leather, paper, etc., either in single layers or laminated, may be impregnated with the dissolved fusible polymer and subjected to the polymerization to the final insoluble infusible state. Other molding powders may be prepared from the new esters without first converting them to the intermediate polymer. The monomer may be mixed directly with a suitable filler such as magnesium carbonate, cellulose pulp, asbestos, etc., in a ball mill or other mixing device. By proper selection of proportions a dry pulverulent powder can be obtained which is capable of polymerization under the influence of heat and pressure to a glossy solid polymer of high tensile strength. The use of too much filler will cause a non-glossy finish and the use of too much monomer will make the powder moist and difficult to handle. Sometimes it may be desirable to precure the molding powder by subjecting it to a moderate temperature of 50 to 70° C. for a limited period of time, for example, one to three hours. This precuring operation is a partial polymerization and permits a dry molding powder where the same proportions of monomer might result in a moist molding composition.

Further details of the synthesis of these new esters and of their applications will be apparent from the following examples.

Example I 3 moles (230 grams) of propylene glycol (1,2-dihydroxy propane) was placed in a flask provided with a stirring mechanism. The flask was submerged in an ice bath. Phosgene was passed into the flask at the rate of 100 millimoles per minute for 70 minutes. During the reaction the temperature of the reaction vessel remained between +5 and +18° C. The propylene glycol dichloroformate was washed with water and dried over anhydrous $Na_2SO_4$. It was distilled at 2 mm. total pressure.

A 2-liter flask equipped with a stirrer and provided with an ice bath was charged with 500 grams of pyridine and 350 grams of allyl alcohol and cooled to 0° C. on an ice bath. The dichloroformate of propylene glycol was added slowly at a rate which permitted the continual maintenance of the temperature below 15° C. When the reaction was completed the ester was washed with dilute HCl and then with sodium chloride solution until neutral to phenolphthalein. The ester was dried over anhydrous $Na_2SO_4$. It was a colorless liquid found to have a density of 1.115 and an index of refraction 1.4414. Its structure was believed to be:

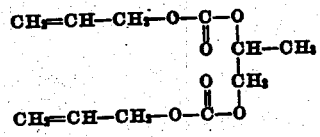

A ten-gram sample was mixed with 3 percent lauroyl peroxide and heated at 70° C. for one hour. A hard, colorless resin was produced.

Example II

A mixture of 160 grams of trimethylene glycol, (1,3-dihydroxy propane) and 500 cc. of 50 percent NaOH solution was cooled to +2° C. on an ice bath in a 2-liter flask. With constant stirring the mixture was added to 480 grams of allyl chloroformate in 200 cc. benzene. For the first half-hour, the addition was made at the rate of 5 grams per minute. The rate of addition was slowly increased until at the end of an hour it was 10 grams per minute. The balance of the chloroformate was added at the rate of 20-25 grams per minute. When the chloroformate addition was completed the mixture was stirred for an hour. During the entire reaction the temperature remained between 0° C. and 12° C. The benzene solution was washed with dilute HCl and with water and dried over $CaCl_2$. The trimethylene glycol bis (allyl carbonate) was purified by distillation. The ester is a colorless high boiling liquid, believed to have the structure:

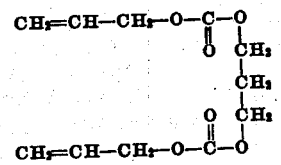

A 25 gram sample was mixed with 5 percent acetone peroxide and heated at 135° C. for one hour. A hard, transparent, and nearly colorless solid polymer was produced.

Example III

Two moles of 2-chloroallyl alcohol (185 grams) was treated with phosgene at 0-10° C. The chloroformate of 2-chloroallyl alcohol produced was washed with dilute HCl dried over anhydrous sodium sulphate and distilled at 2 mm. pressure.

One mole of tetramethylene glycol (90 grams), 175 grams pyridine, and 1000 cc. of benzene were mixed in a two-liter flask equipped with a dropping funnel and stirring device. The mixture was cooled to −2° C. on a salt-ice freezing mixture. The chloroformate of chloroallyl alcohol was then added at a rate just slow enough to keep the reaction temperature below 12° C. The reagents were completely combined in about one and one-half hours. The benzene solution containing the new ester was washed with dilute HCl and with water. The benzene was vaporized by heating at 2-8 mm. The new unsaturated ester was a liquid found to have the structure:

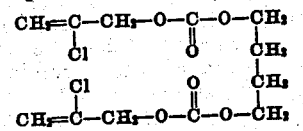

Example IV

Using the procedure of Example II, except that methallyl alcohol was used in place of allyl alcohol, an ester believed to have the following structure was synthesized:

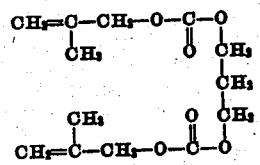

Example V

Fifty grams of tetramethylene glycol bis (chloroallyl carbonate) was mixed with 3 percent benzoyl peroxide and 60 cc. benzol. The solution was heated at 60-65° C. for two hours during which the liquid became quite viscous. The benzene solution was then poured into 300 cc. of ethyl alcohol. A transparent flocculant precipitate was formed which after settling was decanted, washed with water and dried. Ten grams of the polymer was mixed with an additional 3 percent benzoyl peroxide and pressed in a mold at 1500 pounds per square inch at 135° C. A slightly yellow transparent polymer was produced.

Example VI

A 75 gram sample of propylene glycol (1,2-dihydroxy propane) and 500 cc. of benzene was placed in a reaction flask equipped with a stirring mechanism and dropping funnel. The flask was submerged in an ice bath and stirred until the temperature fell to +5° C. With constant stirring phosgene was bubbled in at a rate low enough to permit the temperature to remain at or below 5° C. The bis(chloroformate) dissolved in benzene was washed with water and dilute $Na_2CO_3$ solution and dried over anhydrous sodium sulphate. The chloroformate was then purified by distillation at 2 mm. total pressure.

A mixture of 200 grams pyridine, 300 cc. benzene, and 150 grams of methallyl alcohol was prepared and cooled to 0° C. in a reaction flask submerged in an ice bath. The bis(chloroformate) of propylene glycol was added slowly at the rate of 3 grams per minute for 30 minutes and 5 grams per minute until the entire lot had been added. The benzol solution was washed with water and dilute HCl and dried over sodium sulphate. The ester, which was separated from the benzol and other impurities by distillation, was believed to have the molecular structure:

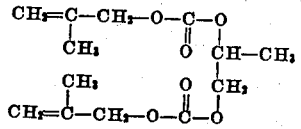

Example VII

A mold was prepared by clamping two sheets of polished plate glass (12" x 12") with a strip of Koroseal (38" x ¼" x ½") between. The flexible Koroseal strip was placed about 1 to 1½" from the edge of the glass plates with the ends about 1 inch short of butting at one corner. The plates were held together with C clamps placed directly over the flexible divider. The mold was placed in a vertical position with the open corner uppermost.

About 500 cc. of 1,2-propylene glycol bis (methallyl carbonate) was thickened by heating for two hours at 60° C. in the presence of 3 percent benzoyl peroxide. The thickened ester was then poured into the mold slowly to avoid entrapping air bubbles. The mold was then heated for 20 hours at 80° C. During the heating the C clamps were tightened every four hours to recover the pressure lost by the shrinking of the resin. The mold was then taken apart and the product was a sheet of resin clear and almost colorless with an optically perfect surface.

Example VIII

About 200 cc. of trimethylene glycol bis (allyl carbonate) was mixed with 20 grams of cellulose pulp, .5 gram cadmium yellow pigment, and 3 percent acetone peroxide. The mixture was heated for four hours in an atmosphere of $CO_2$ maintained by a stream of the $CO_2$ passing through the covered tray. The composition was pulverized and screened. A sample was pressed in a mold under 1800 pounds per square inch at a temperature of 150° C. The product was hard, glossy, semi-translucent, and of a uniform brilliant yellow color.

Although the invention is described with respect to certain specific examples, it is not intended that the details described shall be limitations upon the scope of the invention except as expressly included in the appended claims. This application is a continuation-in-part of Serial Nos. 361,280, filed October 15, 1940, and 403,703, filed July 23, 1941, by Irving E. Muskat and Franklin Strain.

We claim:
1. 1,2-propylene glycol bis (allyl carbonate).
2. Trimethylene glycol bis (methallyl carbonate).
3. Tetramethylene glycol bis (chlorallyl carbonate).
4. A polymer of the 1,2-propylene glycol bis (allyl carbonate).
5. A polymer of trimethylene glycol bis (methallyl carbonate).
6. A polymer of tetramethylene glycol bis (chlorallyl carbonate).
7. A compound corresponding to the following structural formula:

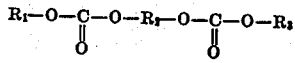

wherein $R_1$ and $R_3$ are each radicals corresponding to the radical R in the alcohol ROH, said alcohol being an unsaturated monohydric alcohol having from three to ten carbon atoms and having an unsaturated carbon to carbon linkage in an aliphatic chain, said unsaturated linkage being between the beta and gamma carbon atoms of the alcohol, and $R_2$ is a divalent saturated aliphatic hydrocarbon radical containing at least three carbon atoms.

8. A polymer of the compound defined by claim 7.

IRVING E. MUSKAT.
FRANKLIN STRAIN.